UNITED STATES PATENT OFFICE.

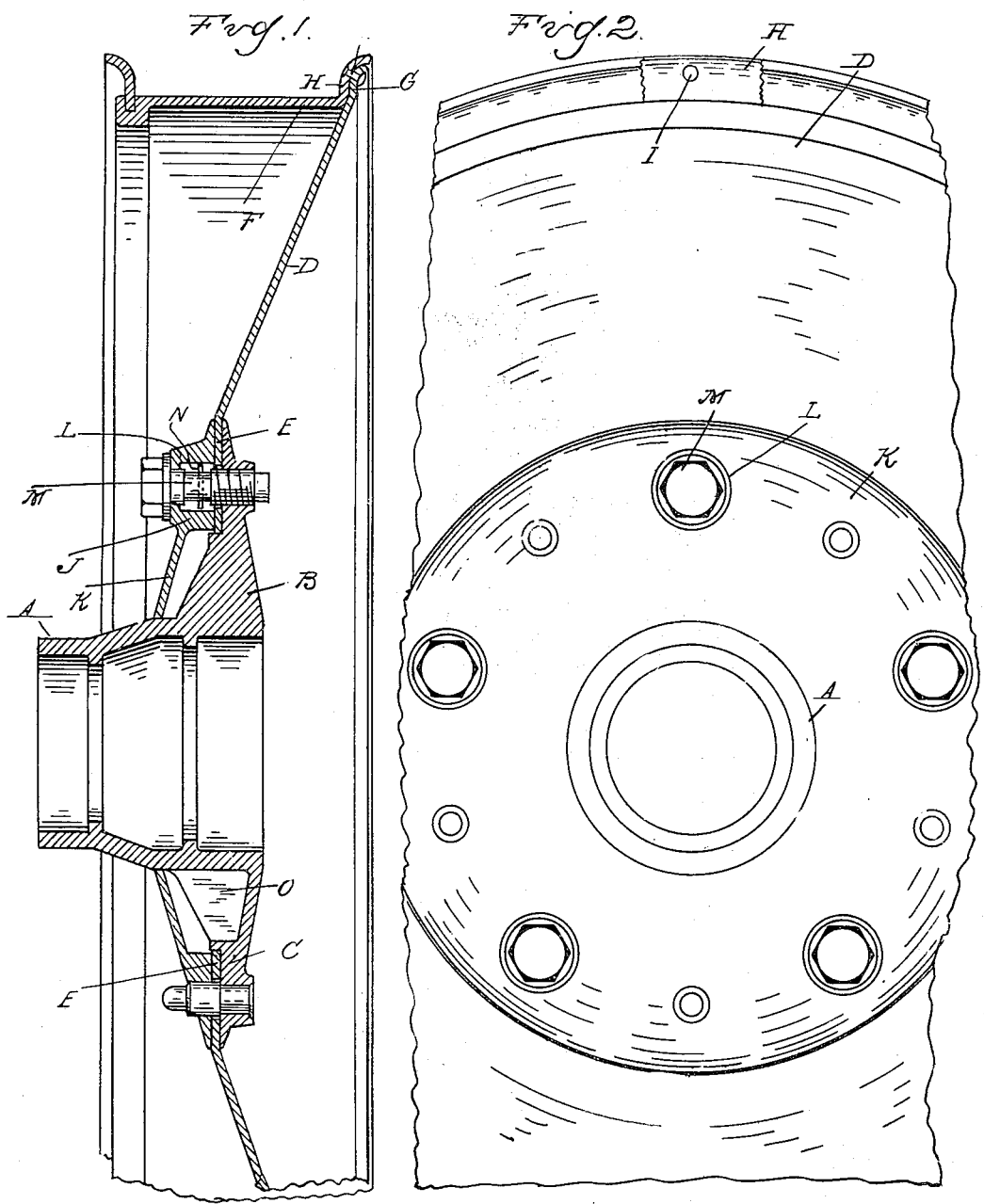

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

VEHICLE-WHEEL.

1,380,926.   Specification of Letters Patent.   Patented June 7, 1921.

Application filed March 27, 1919. Serial No. 285,500.

*To all whom it may concern:*

Be it known that I, ALDEN L. PUTNAM, a citizen of the United States of America, residing at Detroit, in the county of Wayne and State of Michigan, have invented certain new and useful Improvements in Vehicle-Wheels, of which the following is a specification, reference being had therein to the accompanying drawings.

The invention relates to vehicle wheels of the dished disk type and consists in various features of construction as hereinafter set forth.

In the drawings:

Figure 1 is an axial cross-section through the wheel;

Fig. 2 is an elevation thereof.

It is one of the objects of the invention to obtain a construction in which the disk is formed from sheet metal of uniform gage without either unduly increasing the weight or diminishing the strength. It is a further object to obtain a simple means of attaching the disk to the rim.

A is a hub of any suitable construction. B is a flange extending outward from said hub and inclined from its inner to its peripheral edge to produce a dished effect. C is an annular bearing at the outer end of the flange B, which is in a plane parallel to the plane of rotation of the wheel. D is a dished disk having a portion E at its inner edge which is parallel to the plane of rotation and adapted to seat upon the annular bearing C. The disk is oppositely dished from the flange B and its outer edge is secured to the rim F, preferably by having a portion G which fits the outer face of the flange H upon the rim and is secured thereto by rivets I. The disk is secured to the hub by a clamping member J, one face of which is parallel to the portion E and bears thereagainst, while the opposite face is inclined or conical, forming an extension of the dished portion of the disk. The member J is further provided with an inwardly extending portion K, which is at the angle of the outer face of said member and bears with its inner edge against the barrel of the hub. L are hollow bosses on the member J at spaced points around the same, and M are clamping bolts passing through said bosses and having a threaded engagement with the flange B. The shanks of the bolts M are provided with cross pins N engaging the hollow of the boss and forming retainers for preventing the detachment of the bolt, but permitting of longitudinal relative movement of the same in the member J. Thus the bolts may be successively screwed in and out from their bearings in the flange B without interference with each other. The flange B may be strengthened by reinforcing ribs O, as shown.

With the construction as described, the flange B and member J are oppositely inclined and form, in effect, a braced or trussed connection between the hub and the disk. This permits of forming the disk out of uniform and relatively light gage metal and avoids the necessity of machining the disk blank to form a tapering section.

The attachment between the outer edge of the disk and the rim by means of the outwardly extending flange H avoids the necessity of an inwardly extending flange on said rim and utilizes a part which has the further function of retaining the tire.

What I claim as my invention is:

1. In a vehicle wheel, the combination with a rim and hub, of a dished disk secured to said rim and extending part way to the hub, an oppositely dished flange on the hub, and a clamping member for securing said disk to said flange having a portion extending inward to the hub forming an extension of the dish of the disk.

2. In a vehicle wheel, the combination with a rim and hub, of a dished disk secured to the rim and extending part way to the hub, the inner portion of said disk lying in a plane parallel to the plane of rotation, a flange on said hub oppositely dished, a bearing at the outer end of said flange parallel to the inner portion of said disk, a clamping member having a bearing face parallel to the disk and seated on said flange, and a conical portion on said clamping member forming an inward extension of the dished portion of said disk to the hub.

3. In a vehicle wheel, the combination with a rim and hub, of a dished disk secured to said rim and extending part way to the hub, a flange on the hub and a clamping member for securing said disk to said flange having a portion extending inwardly to the hub forming an extension of the dish of the disk.

4. In a vehicle wheel, the combination with a hub and rim, said rim having an outwardly extending flange, of a disk forming a connection between said hub and rim attached to said flange of the rim and dished toward the plane of impact of the wheel in extending toward the hub.

In testimony whereof I affix my signature.

ALDEN L. PUTNAM.